US011946436B2

(12) United States Patent
Maalioune et al.

(10) Patent No.: US 11,946,436 B2
(45) Date of Patent: Apr. 2, 2024

(54) AIRCRAFT CONTROL ARCHITECTURE, OF AT LEAST ONE ACTUATOR OF A NACELLE MOVABLE COWL

(71) Applicant: Safran Nacelles, Gonfreville l'Orcher (FR)

(72) Inventors: Hakim Maalioune, Moissy Cramayel (FR); Alice Portalier, Moissy Cramayel (FR); Julien Corbin, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 0 days.

(21) Appl. No.: 17/184,464

(22) Filed: Feb. 24, 2021

(65) Prior Publication Data

US 2021/0285400 A1 Sep. 16, 2021

Related U.S. Application Data

(63) Continuation of application No. PCT/EP2019/072140, filed on Aug. 19, 2019.

(30) Foreign Application Priority Data

Aug. 24, 2018 (FR) ...................................... 18/57660

(51) Int. Cl.
*F02K 1/76* (2006.01)
(52) U.S. Cl.
CPC .............. *F02K 1/763* (2013.01); *F02K 1/766* (2013.01); *F05D 2270/62* (2013.01); *F05D 2270/809* (2013.01)

(58) Field of Classification Search
CPC ..... F02K 1/70; F02K 1/72; F02K 1/76; F02K 1/763; F02K 1/766; F05D 2270/62
See application file for complete search history.

(56) References Cited

U.S. PATENT DOCUMENTS 4,785,403 A * 11/1988 Kuhlberg .................. F02C 9/28
714/48
2004/0118974 A1* 6/2004 Colotte .................... F02K 1/763
244/110 B (Continued)

FOREIGN PATENT DOCUMENTS

EP 0843089 5/1998
FR 2994220 2/2014

(Continued)

OTHER PUBLICATIONS

International Search Report for International Application PCT/EP2019/072140, dated Oct. 18, 2019.

(Continued)

*Primary Examiner* — Andrew H Nguyen
(74) *Attorney, Agent, or Firm* — Burris Law, PLLC

(57) ABSTRACT

An architecture for controlling and/or monitoring at least one actuator of a mobile cowl of a thrust reverser equipping a nacelle, the actuator being driven by at least one engine, includes at least one engine sensor to provide its control according to instructions, the architecture including an electronic control system to process at least one piece of information generated by the engine sensor and to calculate, using at least this same piece of information, the position of the mobile cowl of the thrust reverser.

8 Claims, 4 Drawing Sheets

(56) References Cited

U.S. PATENT DOCUMENTS

| | | | | |
|---|---|---|---|---|
| 2009/0320444 A1* | 12/2009 | Nouhaud | ............... | F02C 7/22 |
| | | | | 60/226.2 |
| 2010/0168982 A1* | 7/2010 | Maalioune | ............... | F02K 1/72 |
| | | | | 701/100 |
| 2014/0116024 A1* | 5/2014 | Channel | ............... | F02K 1/72 |
| | | | | 60/226.2 |
| 2015/0090810 A1* | 4/2015 | Lallement | ............... | F02K 1/763 |
| | | | | 239/265.19 |
| 2016/0032866 A1 | 2/2016 | Cameron | | |
| 2016/0252050 A1 | 9/2016 | Allut et al. | | |
| 2017/0299469 A1* | 10/2017 | Hagshenas | ............... | G01P 21/02 |
| 2017/0321635 A1* | 11/2017 | Mansouri | ............... | F02K 1/76 |
| 2018/0304991 A1* | 10/2018 | Kudrna | ............... | G01D 5/147 |

FOREIGN PATENT DOCUMENTS

| | | |
|---|---|---|
| RU | 2263045 | 10/2005 |
| RU | 2313681 | 12/2007 |
| RU | 2477380 | 3/2013 |
| RU | 144874 | 9/2014 |
| WO | 2007057524 | 5/2007 |
| WO | 2016071242 | 5/2016 |

OTHER PUBLICATIONS

Office Action issued in corresponding RU Application 2021107144/12(015441), dated Jun. 2, 2023, and an English Translation, 10 pages.

* cited by examiner

AIRCRAFT CONTROL ARCHITECTURE, OF AT LEAST ONE ACTUATOR OF A NACELLE MOVABLE COWL

CROSS-REFERENCE TO RELATED APPLICATIONS

This application is a continuation of International Application No. PCT/EP2019/072140, filed on Aug. 19, 2019, which claims priority to and the benefit of FR 18/57660, filed on Aug. 24, 2018. The disclosures of the above applications are incorporated herein by reference.

FIELD

The present disclosure relates to the field of the architectures for controlling and/or supervising an actuator of a movable structure of a thrust reverser for a turbojet engine.

BACKGROUND

The statements in this section merely provide background information related to the present disclosure and may not constitute prior art.

An airplane is powered by several turbojet engines each housed in a nacelle also accommodating a set of ancillary actuation devices related to the operation thereof and ensuring various functions when the turbojet engines are operating or stopped. These ancillary actuation devices include in particular a thrust reverser.

The role of a thrust reverser during the landing of an airplane is to improve the braking capacity of this aircraft by redirecting forwards at least one portion of the thrust generated by the turbojet engine. In this phase, the thrust reverser obstructs a gas ejection nozzle of the nacelle and directs the ejection flow of the motor towards the front of the nacelle, thereby generating a counter-thrust which is added to the braking of the wheels of the aircraft.

The means implemented to carry out this reorientation of the flow vary according to the thrust reverser type. However, in all cases, a movable structure of a thrust reverser comprises movable cowls displaceable between, on the one hand, a deployed position in which they open, in the nacelle, a passage intended for the diverted flow, and on the other hand, a retraction position in which they close this passage. These movable cowls can also fulfill a function of deflection or simply activation of other deflection means.

In the cascade thrust reversers, for example, the movable cowls slide along the rails so that, when moving back during the opening phase, they discover cascade vanes disposed in the thickness of the nacelle. A connecting rod system connects this movable cowl to blocking doors which are deployed inside the ejection channel and blocks the direct flow outlet. In the door thrust reversers, however, each movable cowl pivots so as to block the flow and divert it, thus by being active in this reorientation.

In general, these movable cowls are actuated by hydraulic or pneumatic actuators which require a transport network of a pressurized fluid. This air or fluid which is pressurized is conventionally obtained either by taking air from the air circuit of the turbojet engine in the case of pneumatic actuators, or by collecting it from the hydraulic circuit of the aircraft in the case of hydraulic actuators. Such actuators require a significant maintenance because the slightest leak in the hydraulic or pneumatic network can be difficult to detect and may have damaging consequences both on the thrust reverser and on other portions of the nacelle. Moreover, due to the reduced space available in the front frame of the thrust reverser, the setting up and protection of such a circuit are particularly delicate and bulky.

In order to overcome the various drawbacks related to pneumatic and hydraulic systems, the thrust reverser manufacturers have sought to replace them and equip their thrust reversers as much as possible with electromagnetic actuators, which are lighter and more reliable. Such a thrust reverser is described in the document EP 0 843 089.

However, the electromagnetic actuators also have several drawbacks that need to be solved to fully benefit from the advantages they provide in terms of gain in mass and space requirement.

In particular, the existing solutions require setting up an electrical system comprising a large number of these sensors in order to respect the constraints of safety and overall reliability of the electrical system. In addition, although the mass of the electrical system is reduced relative to the pneumatic or hydraulic systems, it remains a major constraint in the field of aeronautics.

Moreover, in some nacelles, the space requirement often poses installation problems, which requires having very specific sensors increasing the cost of the retained systems. This is the case, for example, of some nacelles which have dedicated state sensors to specifically detect the locking or unlocking, by hooks, of the nacelle, as well as to detect the open or closed position of the movable cowls of the nacelle.

SUMMARY

This section provides a general summary of the present disclosure and is not a comprehensive disclosure of its full scope or all of its features.

The present disclosure provides a solution making it possible to allowing reducing the mass and the space requirement of the electrical systems of a nacelle while providing a good level of reliability in the detection of unexpected events.

To this end, the present disclosure relates to an architecture for controlling and/or supervising at least one actuator of a movable cowl of a thrust reverser equipping a nacelle, the actuator being powered by at least one motor and comprising at least one motor sensor to ensure a servo-control thereof depending on setpoints, the architecture being characterized in that it comprises an electronic control system for processing at least one information generated by the motor sensor and calculating, from this at least information, a position of the movable cowl of the thrust reverser.

Thus, the motor sensor of the actuator allows calculating the position of the movable cowl at any time, this unlike the prior art where this motor sensor has the only function of ensuring the servo-control of the actuator to ensure the opening or closing of the movable cowl depending on setpoints received by the electronic control system of the actuator.

The calculation of the position of the movable cowl carried out using the motor sensor advantageously allows lightening the architecture of at least one state sensor. Indeed, the open or closed position of the movable cowl can be known from the calculation carried out by the electronic control system depending on the information generated by the motor sensor.

It should be noted that the information generated by the motor sensor relates to a displacement of the actuator such that it is possible to calculate the position of the movable cowl at any time.

According to one feature, the motor sensor can be an angular sensor configured to generate said information from an angle measurement of a rotor of the motor.

The angle measurement of the rotor allows determining the displacement of the actuator. For this, from an angle measurement, the number of revolutions performed by the actuator secured to the rotor can be known. The displacement of the actuator can then be calculated depending on this number of revolutions and the step of the actuator. Thus, the position of the movable cowl displaced by the actuator can be known.

According to a variant, in an in-flight configuration, the architecture is configured to detect a movement of the movable cowl of the thrust reverser from a calculation, by the electronic control system, of a difference of two angle measurements of the rotor by the motor sensor at two distinct times.

The difference of these two angle measurements can advantageously be compared to a predetermined value from which the movement of the movable cowl represents a risk of deployment in flight.

According to another variant, in a thrust reversal configuration, the architecture is configured to calculate, from the electronic control system, an absolute position of the movable cowl of the thrust reverser depending on an integral of an angle measurement of the rotor between an initial time t0, corresponding to an initial position of the movable structure, and a given time t, corresponding to the absolute position of the mobile structure.

The absolute position corresponds to the position of the movable cowl at a given time t. In a deployed configuration of the movable cowl, the absolute position corresponds to the deployed position of the movable cowl.

According to particular forms, the architecture may comprise one or more of the following features taken in isolation or according to any possible technical combination:

the electronic control system may comprise at least one full authority electronic regulation unit of the motor of the actuator, the electronic control system may comprise an electronic control unit dedicated to the servo-control of the motor, and electrically connected to the full authority electronic regulation unit, the motor sensor being electrically connected to the electronic control unit, the electronic control system may comprise two full authority electronic regulation units, so as to form a duplex system operating in the case of failure of one of these two units, the electronic control unit can be integrated into the at least one full authority electronic regulation unit.

the architecture may comprise two two-channel sensors of the state of the primary locks of the movable cowl of the thrust reverser, each two-channel sensor being electrically connected to the full authority electronic regulation unit the architecture may comprise two single-channel sensors of the state of the primary locks of the movable cowl of the thrust reverser, each single-channel sensor being electrically connected to the full authority electronic regulation unit, the architecture may comprise a single-channel sensor of the state of a tertiary lock of the movable cowl which is electrically connected to the full authority electronic regulation unit, the architecture may comprise a single-channel sensor for detecting the position of the movable cowl of the thrust reverser, the single-channel detection sensor being electrically connected to the full authority electronic regulation unit.

Further areas of applicability will become apparent from the description provided herein. It should be understood that the description and specific examples are intended for purposes of illustration only and are not intended to limit the scope of the present disclosure.

DRAWINGS

In order that the present disclosure may be well understood, there will now be described various forms thereof, given by way of example, reference being made to the accompanying drawings, in which.

Figure 1:
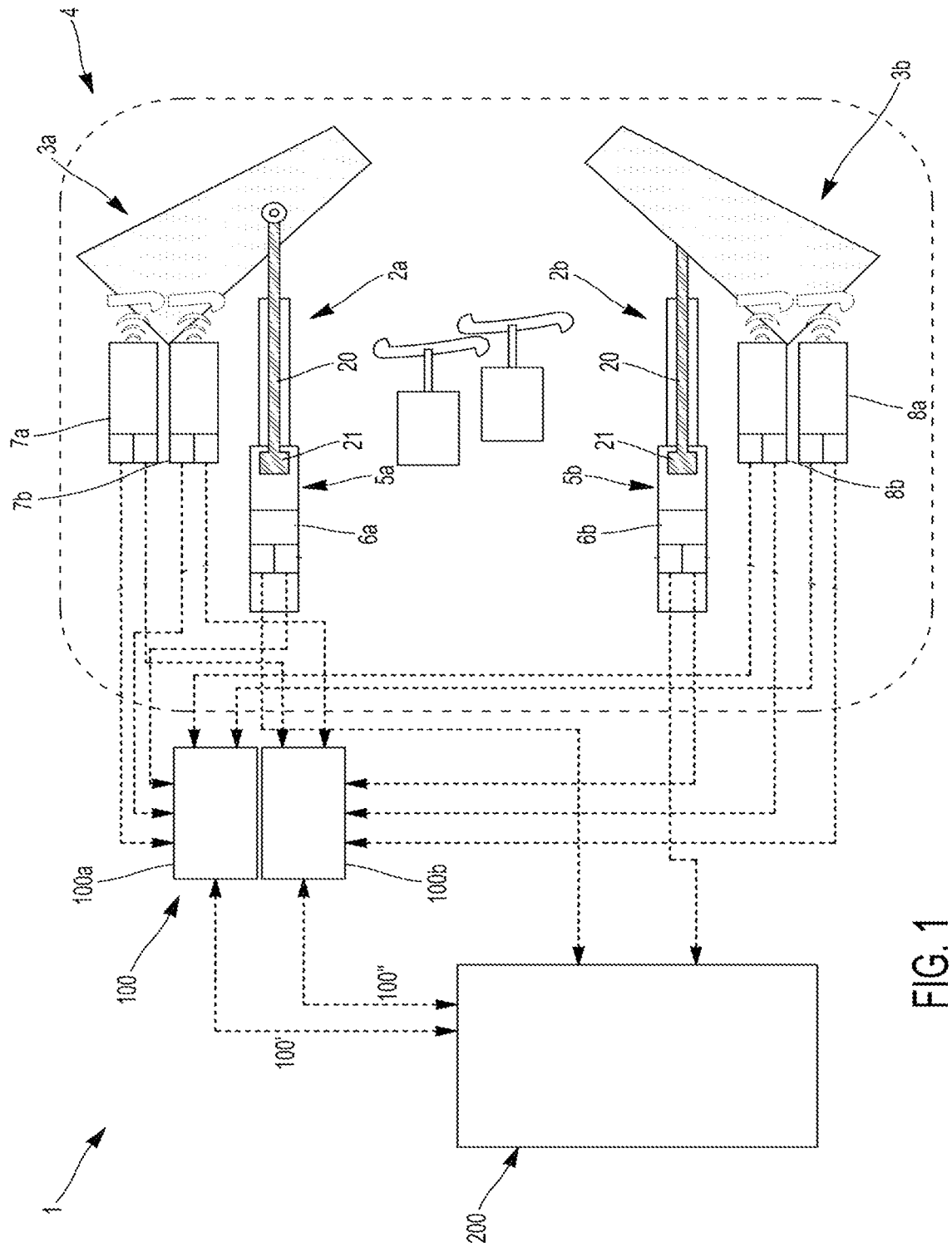
FIG. 1 represents a functional diagram of an architecture for controlling and/or supervising at least one actuator of a movable cowl of a thrust reverser equipping a nacelle, according to a first variation of the present disclosure

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

With reference to FIG. 1, an architecture 1 is represented, for controlling and/or supervising control actuators 2a, 2b of movable cowls 3a, 3b of a thrust reverser 4 equipping a nacelle.

The thrust reverser 4 includes two movable cowls 3a, 3b, namely a first movable cowl 3a and a second movable cowl 3b, each displaceable between an open position and a closed position of the thrust reverser by at least one control actuator 2a, 2b. The movable cowls 3a, 3b together form a movable structure.

The thrust reverser 4 further includes two electric motors 5a, 5b each monitoring the displacement of a movable cowl 3a, 3b. These electric motors 5a, 5b drive the control actuators 2a, 2b of each movable cowls 3a, 3b via a threaded rod 20 connecting each movable cowl 3a, 3b to the associated electric motor 5a, 5b thereof.

An electronic control system comprises an electronic control unit 200 dedicated to the servo-control of the electric motors 5a, 5b and a full authority electronic regulation unit of the electric motors 5a, 5b, commonly known as FADEC (Full Authority Digital Engine Control). The full authority electronic regulation unit advantageously comprises an electronic module 100 for monitoring the electric motors 5a, 5b commonly referred to as EEC (Electronic Engine Control). The electronic monitoring module 100 itself comprises a first electronic sub-module 100a dedicated to the control of the first movable cowl 3a and a second electronic sub-module 100b dedicated to the control of the second movable cowl 3b.

According to the represented configuration, each electric motor 5a, 5b is electrically connected to the electronic control unit 200 which manages the sequence of displacement of the two movable cowls 3a, 3b by regulating the speed of rotation of the electric motors 5a, 5b.

The electronic control unit 200 is electrically connected by a 100', 100" bidirectional link to each of the electronic sub-modules 100a, 100b. The 100', 100" bidirectional link is advantageously of the ARINC type. This bidirectional link includes two data exchange bidirectional channels 100', 100". A first channel 100' is electrically connected to the first electronic sub-module 100a and a second channel 100" is electrically connected to the second electronic sub-module 100b. Each channel 100', 100" transmits, from the electronic control unit 200 to the associated electronic sub-module 100a, 100b thereof, data relating to the position of each of the movable cowls 3a, 3b, such that the position of the first movable cowl 3a and the second movable cowl 3b is known to each electronic sub-module 100a, 100b.

Depending on these data, the order of deployment or retraction of the movable structure of the thrust reverser 4 is emitted by the electronic monitoring module 100 to the electronic control unit 200. It is also possible to integrate the electronic control unit 200 into the full authority electronic regulation unit. The electronic control unit 200 is provided to transform control setpoints received by the electronic monitoring module 100 of the electric motors 5a, 5b into a current control of the electric motors 5a, 5b.

The control actuators 2a, 2b of the thrust reverser are of the electromechanical type. They are driven by gearboxes mounted on each actuator. A control law (in speed or of the on-off type) of the actuators 2a, 2b of the movable cowls 3a, 3b of the thrust reverser 4 is transmitted from the electronic control unit 200 to each control actuator 2a, 2b via the electric motors 5a, 5b, the threaded actuating rods 20 and the gearboxes 21.

Each control actuator 2a, 2b advantageously comprises a motor sensor 6a, 6b. This angular type motor sensor 6a, 6b is provided to generate information relating to an angle measurement of a rotor of the associated electric motor 5a, 5b. The information generated by the motor sensor 6a, 6b is transmitted to the electronic control unit 200. Specifically, the motor sensor 6a includes a first channel 6a' that transmits information to the electronic control unit 200 and a second channel 6a" that transmits information to the electronic sub-module 100a. The motor sensor 6b includes a first channel 6b' that transmits information to the electronic control unit 200 and a second channel 6b" that transmits information to the electronic sub-module 100b.

The angle measurement of the rotor allows determining the displacement stroke of the actuation rod 20 of the associated actuator 2a, 2b. More particularly, from an angle measurement, the number of revolutions performed by the actuating rod 20 of the actuator 2a, 2b secured to the rotor can be known. The displacement of the actuator 2a, 2b can then be calculated depending on this number of revolutions and of the pitch of the threaded actuation rod 20. Thus, the position of the movable cowl 3a, 3b displaced by the rod 20 of the corresponding actuator 2a, 2b can be known at any time.

The electronic monitoring module 100 of the electric motors 5a, 5b connected by the bidirectional channels 100', 100" to the electronic control unit 200 can therefore monitor and/or supervise the position of the movable cowls 3a, 3b at any time.

According to a first application, in an in-flight configuration, a detection of the movement of each movable cowl 3a, 3b can be provided at the actuators 2a, 2b in order to prevent a deployment of the thrust reverser 4. For this, the electronic control unit 200 calculates a difference between two angle measurements of the rotor of the electric motor 5a, 5b received by the motor sensor 6a, 6b at two distinct times. The comparison of this difference relative to a reference value allows detecting a displacement of the stroke of the actuation rod 20 and, consequently, detecting a movement of the associated movable cowl 3a, 3b.

According to a second application, in a thrust reversal configuration, the deployed position of the movable cowls 3a, 3b can be identified by calculating an integral of a rotor angle measurement between an initial time t0, corresponding to the initial position of the movable structure, and a given time t, corresponding to the deployed position of the movable cowls 3a, 3b. It is then possible to identify a deployed position of the movable cowl 3a, 3b, this without a sensor for detecting this position.

In these two applications, the motor sensor 6a, 6b allows, on the one hand, ensure a servo-control of the corresponding electric motor 5a, 5b, and on the other hand, monitoring and/or supervising the position of the movable cowl 3a, 3b associated with this electric motor 5a, 5b.

The thrust reverser 4 can include three locking levels which allow ensuring individually the retention of the thrust reverser.

A first locking level is carried out a first type of mechanical lock called primary lock, associated with each by movable cowl 3a, 3b of the thrust reverser 4. Each primary lock is mounted directly on an electric motor 5a, 5b. These primary locks allow ensuring a retention of the movable cowl 3a, 3b which is associated therewith. For example, they can be of the disc brake type or of the pin blocking type hindering the movement of the actuation rod 20.

Given that the two movable cowls 3a, 4b are mechanically linked via mechanical links (not represented), the primary lock of one of the movable cowls 3a, 3b constitutes a second level of locking for the other movable cowl 3a, 3b of which it forms a secondary lock. The secondary lock is intended to resume the loads of the movable cowl 3a, 3b in the case of failure of the primary lock. Thus, if the first type of mechanical lock of one of the movable cowls 3a, 3b is considered as the primary lock, the first type of mechanical lock of the other movable cowl 3a, 3b can be considered as being the secondary lock and reciprocally.

The third level of locking is carried out by a second type of abutting mechanical lock, called a tertiary lock, which is positioned at a lateral end of each movable cowl 3a, 3b or of a single movable cowl 3a, 3b. This or these tertiary lock(s) can be connected to the electronic control unit 200, to the electronic monitoring module 100 of the electric motors 5a, 5b and/or directly to the cockpit of the airplane. They are preferably controlled directly from the cockpit of the airplane in order to ensure a sufficient operating safety and to avoid any possible common modes. Indeed, when connected to the electronic monitoring module 100 or to the airplane cockpit, the tertiary lock(s) remain operational even in the event of failure of the electronic control unit 200. This(these) lock(s) allow resuming the load(s) of the movable cowl 3a, 3b of the thrust reverser 4 in the case of failure of the primary and secondary locks.

In this first variation represented in FIG. 1, the architecture 1 comprises, for each movable cowl 3a, 3b, two two-channel sensors 7a, 7b, 8a, 8b of the state of the primary locks. Each two-channel sensor 7a, 7b, 8a, 8b is electrically connected to each of the electronic sub-modules 100a, 100b, so as to ensure a redundancy of the data emitted by these two-channel sensors 7a, 7b, 8a, 8b between each of the electronic sub-modules 100a, 100b.

This redundancy, called the first redundancy, is then performed by each electronic sub-module 100a, 100b between the state of the two-channel sensors 7a, 7b of the primary locks associated with this electronic sub-module 100a, 100b.

This first variation illustrates a variant in which the motor sensor 6a of the actuator 2a of the first movable cowl 3a is electrically connected to the first electronic sub-module 100a, and where the motor sensor 6b of the actuator 2b of the second movable cowl 3b is electrically connected to the second electronic sub-module 100a. In this variant, the first electronic sub-module 100a can be configured to independently calculate the position of the first movable cowl 3a and the second electronic sub-module 100b can be configured to independently calculate the position of the second movable cowl 3b. For each of the motor sensors 6a, 6b, the generated information is then received by the corresponding electronic sub-module 100a, 100b.

Another redundancy, called second redundancy, is then performed by each electronic sub-module 100a, 100b and for each movable cowl 3a, 3b, between, on the one hand, the position of the corresponding movable cowl 3a, 3b which is calculated by the electronic control unit 200 and, on the other hand, the position of the same movable cowl 3a, 3b which is calculated by the electronic sub-module 100a, 100b itself.

In the case of failure of the calculation of the position of the movable cowl 3a, 3b by the electronic control unit 200, the position of the corresponding movable cowl 3a, 3b which is calculated by the electronic sub-module 100a, 100b itself may have authority and vice versa.

The first redundancy and the second redundancy which are used in combination with each other allows carrying out monitoring and/or supervising the position of the movable cowls 3a, 3b in order to ensure a synchronized position or displacement of one of the movable cowls 3a, 3b relative to the other movable cowl 3a, 3b.

It should be noted that this first variation allows eliminating a sensor of the state of the tertiary lock, as well as, for each movable cowl 3a, 3b, a sensor for detecting the position of this cowl.

Figure 2:
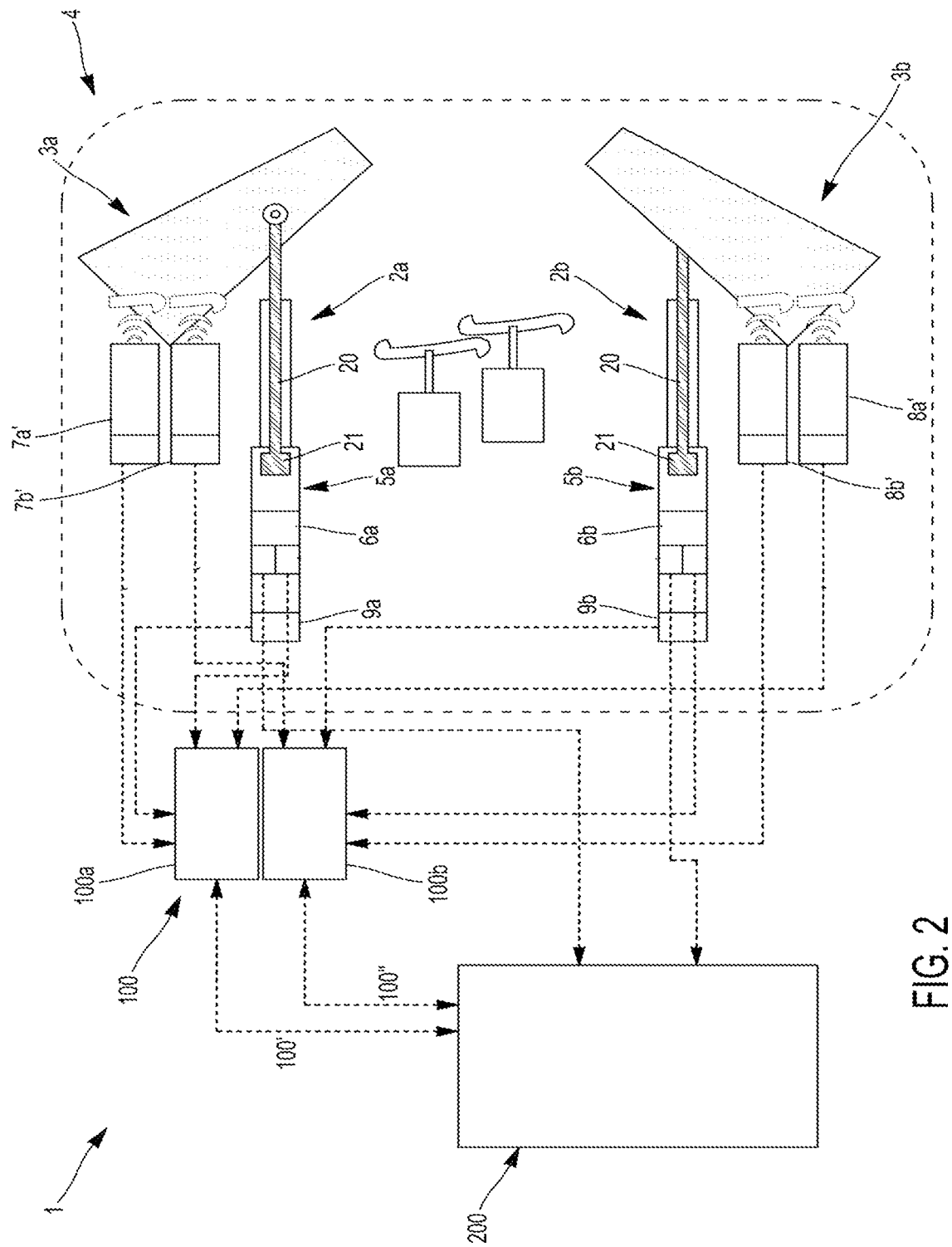
FIG. 2 represents a functional diagram of the architecture illustrated in FIG. 1 according to a second variation of the present disclosure.

In FIG. 2, a second variation of the architecture, represented in FIG. 1, is represented. The architecture 1 according to this second variation differs from the first variation in that the two-channel sensors 7a, 7b, 8a, 8b are single-channel sensors 7a', 7b', 8a', 8b' and of which, for each movable cowl 3a, 3b, a first single-channel sensor 7a', 8a' is electrically connected to the first electronic sub-module 100a and a second single-channel sensor 7b', 8b' is electrically connected to the second electronic sub-module 100a. This architecture 1 also comprises, for each movable cowl 3a, 3b, a single-channel sensor 9a, 9b of the state of a tertiary lock of the corresponding movable cowl 3a, 3b.

In this second variation, the first redundancy and the second redundancy are carried out identically to the first variation, this second variation further comprises an additional redundancy, called third redundancy, where the state of the single-channel sensor 9a, 9b of the tertiary lock of the associated movable cowl 3a, 3b is taken into account.

The first redundancy, second redundancy and third redundancy are used in combination with each other for the same purpose as the architecture 1 of the first variation.

Figure 3:
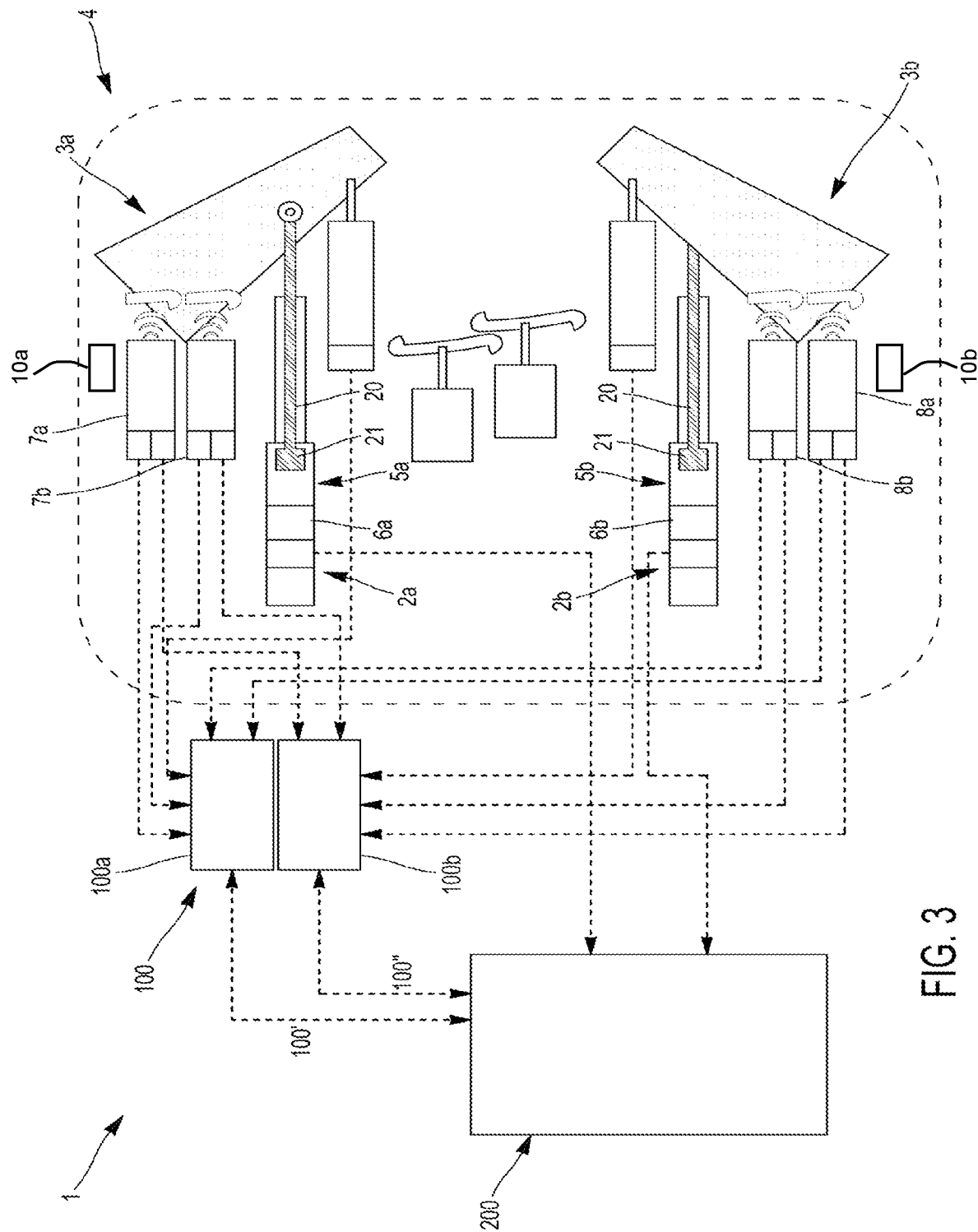
FIG. 3 represents a functional diagram of the architecture illustrated in FIG. 1 according to a third variation of the present disclosure.

In FIG. 3, a third variation of the architecture, represented in FIG. 1, is represented. The architecture 1 according to this third variation differs from the first variation in that it further comprises, for each movable cowl 3a, 3b, a single-channel sensor for detecting its position.

In this third variation, the first redundancy and the second redundancy are carried out identically to the first variation, this second variation further comprises an additional redundancy, called third redundancy, where the state of the single-channel sensor for detecting the associated movable cowl 3a, 3b is taken into account.

In this third variation, the first redundancy, second redundancy and third redundancy are used in combination with each other for the same purpose as the architecture 1 of the first variation.

Advantageously, in this third variation, only the second redundancy and the third redundancy are used in combination with each other for the same purpose as the architecture 1 of the first variation.

Figure 4:
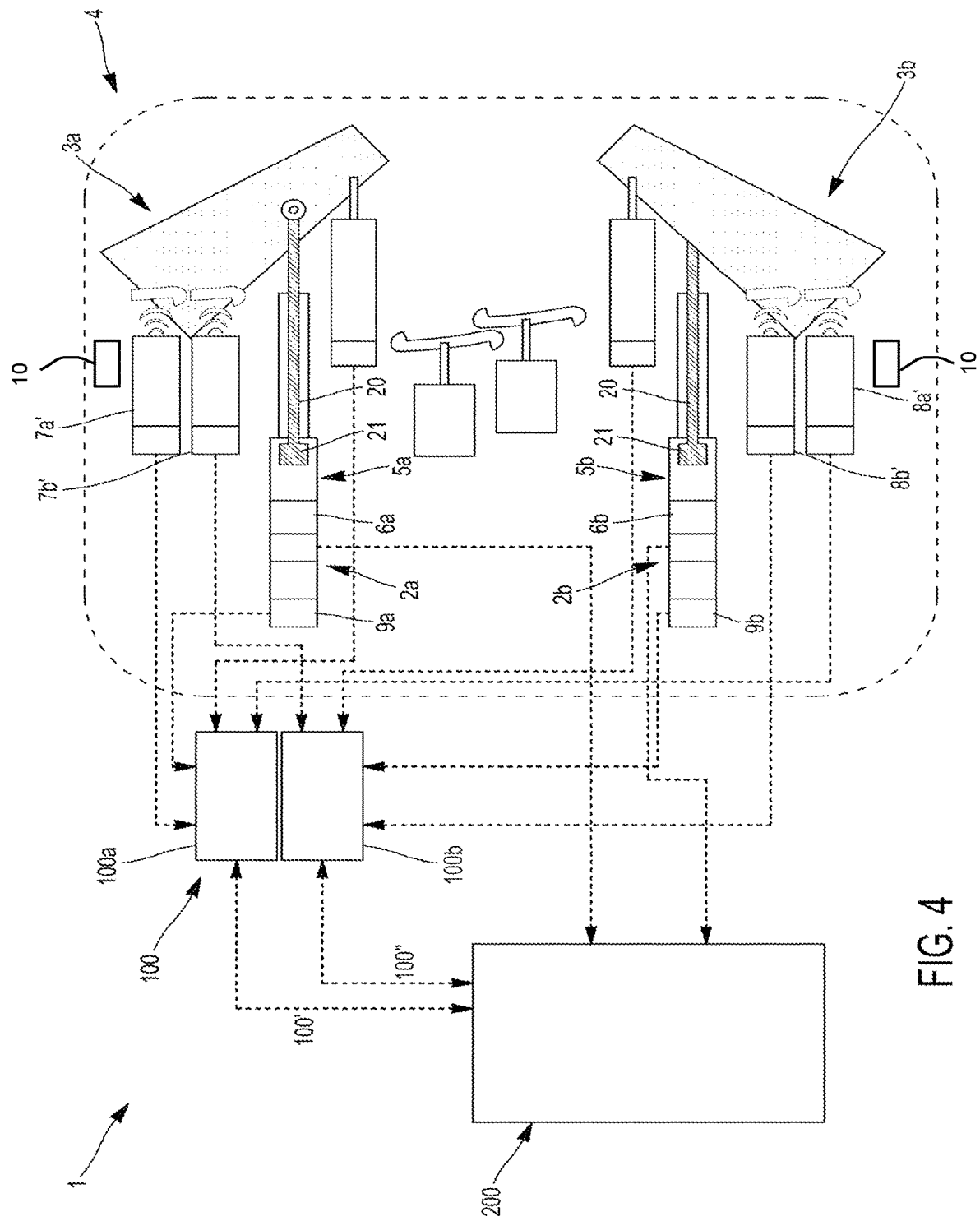
FIG. 4 represents a functional diagram of the architecture illustrated in FIG. 1 according to a fourth variation of the present disclosure.

In FIG. 4, a fourth variation of the architecture, represented in FIG. 2, is represented. The architecture 1 according to this fourth variation differs from the second variation in that it further comprises, for each movable cowl 3a, 3b, a single-channel sensor for detecting its position.

In this fourth variation, the first redundancy and the second redundancy are carried out identically to the second variation, this fourth variation further comprises an additional redundancy, called third redundancy, where the state of the single-channel sensor of the tertiary lock of the associated movable cowl 3b is taken into account.

In this fourth variation, the first redundancy, second redundancy and third redundancy are used in combination with each other for the same purpose as the architecture 1 of the first variation.

Of course, the present disclosure is not limited to the only variations of the architecture described in these different variations by way of example without however departing from the context of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the present disclosure is merely exemplary in nature and, thus, variations that do not depart from the substance of the present disclosure are intended to be within the scope of the present disclosure. Such variations are not to be regarded as a departure from the spirit and scope of the present disclosure.

What is claimed is:

1. An architecture for controlling and/or supervising at least one actuator of a movable cowl of a thrust reverser of a nacelle, the at least one actuator being powered by at least one motor, the at least one actuator comprising at least one motor sensor, the architecture comprising:
   an electronic control unit configured to determine a position of the movable cowl to provide a servo-control of the at least one actuator depending on setpoints; and
   an electronic monitoring module electrically connected to the electronic control unit and independent of the electronic control unit for processing information generated by the at least one motor sensor and calculating, from the information, the position of the movable cowl of the thrust reverser for monitoring the position of the movable cowl at any time, wherein the electronic control unit is configured to determine the position of the movable cowl based on data from the electronic monitoring module, wherein the at least one motor sensor is an angular sensor configured to generate the information from an angle measurement of a rotor of the at least one motor, and wherein, in a thrust reversal configuration, the architecture is configured to calculate the position of the movable cowl of the thrust reverser depending on an integral of an angle measurement of the rotor between an initial time, corresponding to an initial position of the movable cowl, and a given time t.

2. The architecture according to claim 1, wherein, in an in-flight configuration, the architecture is configured to detect a movement of the movable cowl of the thrust reverser from a calculation, by the electronic control unit, of a difference of two angle measurements of the rotor by the at least one motor sensor at two distinct times.

3. The architecture according to claim 1, wherein the architecture further comprises two two-channel sensors of a state of primary locks of the movable cowl of the thrust reverser, each two-channel sensor being electrically connected to the at least one full authority electronic regulation unit.

4. The architecture according to claim 1, characterized in that the architecture further comprises two single-channel sensors of a state of primary locks of the movable cowl of the thrust reverser, each single-channel sensor being electrically connected to the electronic monitoring module.

5. The architecture according to claim 1, wherein the architecture further comprises at least one single-channel sensor of a state of a tertiary lock of the movable cowl which is electrically connected to the electronic monitoring module.

6. The architecture according to claim 1, wherein the architecture further comprises a single-channel sensor for detecting the position of the movable cowl of the thrust reverser, the single-channel detection sensor being electrically connected to the electronic monitoring module.

7. The architecture according to claim 1, wherein the electronic control unit is configured to transmit data relating to the position of the movable cowl to the electronic monitoring module.

8. The architecture according to claim 1, wherein an order of deployment or retraction of the movable cowl is emitted by the electronic monitoring module to the electronic control unit.

* * * * *